US009856385B2

(12) United States Patent
Ormerod et al.

(10) Patent No.: US 9,856,385 B2
(45) Date of Patent: Jan. 2, 2018

(54) THIN ALUMINIUM FLAKES

(71) Applicant: BASF SE, Ludwigshafen (DE)

(72) Inventors: Geoff Ian Ormerod, Darwen (GB);
Michelle Richert, Illzach (FR);
Michael Milde, Grenzach-Wyhlen
(DE); Gregoire Folly, Muttenz (CH)

(73) Assignee: BASF SE, Ludwigshafen (DE)

( * ) Notice: Subject to any disclaimer, the term of this patent is extended or adjusted under 35 U.S.C. 154(b) by 63 days.

(21) Appl. No.: 14/515,683

(22) Filed: Oct. 16, 2014

(65) Prior Publication Data

US 2015/0035270 A1 Feb. 5, 2015

Related U.S. Application Data

(62) Division of application No. 13/139,623, filed as application No. PCT/EP2009/066659 on Dec. 9, 2009, now abandoned.

(30) Foreign Application Priority Data

Dec. 19, 2008 (EP) ..................................... 08172290

(51) Int. Cl.
| | | |
|---|---|---|
| *C09D 7/12* | (2006.01) | |
| *B42D 25/378* | (2014.01) | |
| *B42D 25/373* | (2014.01) | |
| *B42D 25/47* | (2014.01) | |
| *B82Y 30/00* | (2011.01) | |
| *C08K 3/08* | (2006.01) | |
| *C09C 1/64* | (2006.01) | |
| *C09D 11/037* | (2014.01) | |
| *B42D 25/29* | (2014.01) | |
| *B42D 25/328* | (2014.01) | |
| *B42D 25/30* | (2014.01) | |
| *B42D 25/405* | (2014.01) | |
| *B05D 1/38* | (2006.01) | |
| *B05D 3/06* | (2006.01) | |
| *B32B 37/00* | (2006.01) | |
| *B32B 37/12* | (2006.01) | |

(52) U.S. Cl.
CPC ............. *C09D 7/1291* (2013.01); *B05D 1/38* (2013.01); *B05D 3/067* (2013.01); *B32B 37/025* (2013.01); *B32B 37/1207* (2013.01); *B42D 25/29* (2014.10); *B42D 25/30* (2014.10); *B42D 25/328* (2014.10); *B42D 25/373* (2014.10); *B42D 25/378* (2014.10); *B42D 25/405* (2014.10); *B42D 25/47* (2014.10); *B82Y 30/00* (2013.01); *C08K 3/08* (2013.01); *C09C 1/64* (2013.01); *C09D 7/1283* (2013.01); *C09D 11/037* (2013.01); *B32B 2305/72* (2013.01); *B32B 2307/4023* (2013.01); *B32B 2310/0831* (2013.01); *B42D 2033/10* (2013.01); *B42D 2033/20* (2013.01); *C01P 2004/61* (2013.01); *C01P 2004/62* (2013.01); *C01P 2004/64* (2013.01); *C01P 2006/60* (2013.01); *C08K 2003/0812* (2013.01); *Y10T 428/12014* (2015.01)

(58) Field of Classification Search
CPC ....... C09D 11/037; C09D 7/1291; C09C 1/64; C08K 2003/0812; C08K 3/08
USPC .......................................................... 977/810
See application file for complete search history.

(56) References Cited

U.S. PATENT DOCUMENTS

| | | |
|---|---|---|
| 4,082,458 A | 4/1978 | Fukui et al. |
| 4,116,710 A | 9/1978 | Heikel |
| 4,321,087 A | 3/1982 | Levine et al. |
| 6,344,245 B1 * | 2/2002 | Kay .......................... B41M 3/14 427/164 |
| 6,364,983 B1 * | 4/2002 | Kay .......................... B32B 38/10 156/230 |
| 6,398,999 B1 | 6/2002 | Josephy et al. |
| 6,863,851 B2 | 3/2005 | Josephy et al. |
| 7,157,116 B2 | 1/2007 | Weinert |
| 7,943,194 B2 | 5/2011 | Bujard et al. |
| 8,453,570 B2 | 6/2013 | Boswell et al. |
| 2007/0070503 A1 | 3/2007 | Boswell et al. |
| 2010/0062244 A1 | 3/2010 | Bujard |
| 2010/0090455 A1 | 4/2010 | Boswell et al. |
| 2011/0033664 A1 | 2/2011 | Dicker et al. |

FOREIGN PATENT DOCUMENTS

| | | | |
|---|---|---|---|
| GB | 1465908 | 3/1977 | |
| GB | WO 2005049745 A1 * | 6/2005 | ............... C09D 5/38 |
| JP | 2002-004031 | 1/2002 | |
| JP | 2005-510629 | 4/2005 | |
| JP | 2008-202076 | 9/2008 | |
| JP | 2008-539322 | 11/2008 | |
| WO | 03/046245 | 6/2003 | |
| WO | 2005/049745 | 6/2005 | |
| WO | 2005/051675 | 6/2005 | |
| WO | 2005/057254 | 6/2005 | |
| WO | 2006/116641 | 11/2006 | |
| WO | 2008/061930 | 5/2008 | |

OTHER PUBLICATIONS

Seubert (PVD aluminum pigments: Superior brilliance for coatings and graphic arts. Surface Coatings International Part A. Issue 06, 2001, pp. 240-245).*

English language machine-generated translation of JP2008-202076 (17 Pages); 2008.

English language machine-generated translation of JP2002-004031 (8 Pages); 2002.

* cited by examiner

*Primary Examiner* — Brieann R Johnston
(74) *Attorney, Agent, or Firm* — Marshall, Gerstein & Borun LLP

(57) ABSTRACT

The present invention relates to aluminum flakes having a thickness between 7 and 9 nm, coating compositions containing them and the use of the coating compositions for forming (security) products. When the compositions of the present invention are used in coating a hologram the obtained products show an extremely bright OVD image and extremely strong rainbow effect, high purity and contrast.

5 Claims, No Drawings

THIN ALUMINIUM FLAKES

The present invention relates to aluminium flakes having a thickness between 7 and 9 nm, coating compositions containing them and the use of the coating compositions for forming (security) products. When the compositions of the present invention are used in coating a hologram the obtained products show an extremely bright OVD image and extremely strong rainbow effect, high purity and contrast.

GB-A-1,465,908 (U.S. Pat. No. 4,116,710) relates to a method for the preparation of particulate metal, such as aluminium, which method comprises depositing a metal coating on a substrate by vapor, electroless or sputter deposition and removing the metal coating from the substrate by dissolving the substrate in a solvent therefor, the thickness of the deposited coating being such that upon dissolution of the substrate the metal is released as a plurality of metal particles. The metal platelets obtained by the process have a thickness of from 20 to 100 nm, especially 35 to 60 nm.

U.S. Pat. No. 4,321,087 discloses a continuous process for preparing finely divided metal particles comprising the steps of: (a) applying a release coating onto at least one side of a continuous carrier sheet in an amount of from 0.75 to 1.50 lbs. of said release coating per side of said carrier sheet, (b) depositing in the form of a thin film, a metal selected from the group consisting of aluminum, chromium, copper, steel, silver and gold, in an amount of from 35 to 45 nm thickness directly onto said release coating, (c) passing said carrier sheet with said release coating and said film of said metal through a solvent for solubiling said release coating but which is non-reactive with said metal, (d) removing said film of said metal from said carrier sheet in a particulate form to produce the metal particles substantially free of said release coating, and collecting the metal particles in a non-reactive solvent which is non-reactive with said metal. (e) concentrating the metal particles, and (f) breaking the metal particles into pigment particles having a particle size diameter between about 25 and 50 microns.

WO0024946 discloses a process for making flakes comprising: providing a vapor deposition chamber; placing a transport device in the vapor deposition chamber; providing a release coat source and a vacuum deposition source in the vacuum deposition chamber directed toward the transport device, in which the deposition source deposits a layer of flake material; applying a vacuum to the chamber, and while the chamber is evacuated, applying-alternate layers of a release coat from the release coat source and a vapor deposited flake layer from the vacuum deposition source to the transport device in sequence to build up a multi-layer sandwich of alternating flake material layers and intervening release coat layers, the release coat layers comprising a dissolvable material that forms a smooth continuous barrier layer and support surface on which the flake material layers can be formed, so that removal of the sandwich from the evacuated chamber yields a multi-layer sandwich which can be easily separated into flakes of fine particle size by subsequent treatment with a material that essentially completely dissolves the intervening release coat layers to remove them from the flakes.

According to WO00024946 another process for making metal flakes is a process of Avery Dennison Corporation for making flakes sold under the designation Metalure®. In this process both sides of a polyester carrier are gravure coated with a solvent-based resin solution. The dried coated web is then transported to a metallizing facility where both sides of the coated sheet are metallized by a thin film of vapor deposited aluminum. The sheet with the thin metal film is then returned to the coating facility where both sides of the aluminum are coated with a second film of the solvent-based resin solution. The dried coated/metal sheet is then transported again to the metallizing facility to apply a second film of vapor deposited aluminum to both sides of the sheet. The resulting multi-layer sheet is then transported for further processing to a facility where the coatings are stripped from the carrier in a solvent such as acetone. The stripping operation breaks the continuous layer into particles contained in a slurry. The solvent dissolves the polymer out from between the metal layers in the slurry. The slurry is then subjected to sonic treatment and centrifuging to remove the solvent and the dissolved coating, leaving a cake of concentrated aluminum flakes approximately 65% solids. The cake is then let down in a suitable vehicle and further sized by homogenizing into flakes of controlled size for use in inks, paints, and coatings. Metal flakes produced by this process for use in printable applications such as inks are characterized by a particle size from about 4 to 12 microns and a thickness from about 150 to about 250 angstroms.

WO020090613 as well as WO03046245 discloses a process for the preparation of flakes having a high aspect ratio in which the flakes have an average particle size from about 4 to about 12 microns and a single layer thickness from about 5 to about 500 angstroms.

WO02/094945 relates to a method for the production of plane-parallel platelets, comprising the steps:
a) vapour-deposition, at a pressure below atmospheric pressure, of a separating agent onto a carrier to produce a separating agent layer,
b) vapour-deposition, at a pressure below atmospheric pressure, of at least one product layer onto the separating agent layer, and
c) dissolution of the separating agent layer in a solvent and production of a suspension in which the at least one product layer is present in the form of plane-parallel platelets, in which method the separating agent is selected from the group consisting of anthracene, anthraquinone, acetamidophenol, acetylsalicylic acid, camphoric anhydride, benzimidazole, benzene-1,2,4-tricarboxylic acid, biphenyl-2,2-dicarboxylic acid, bis(4-hydroxyphenyl)sulfone, dihydroxyanthraquinone, hydantoin, 3-hydroxybenzoic acid, 8-hydroxyquinoline-5-sulfonic acid monohydrate, 4-hydroxycoumarin, 7-hydroxycoumarin, 3-hydroxynaphthalene-2-carboxylic acid, isophthalic acid, 4,4-methylene-bis-3-hydroxynaphthalene-2-carboxylic acid, naphthalene-1,8-dicarboxylic anhydride, phthalimide and its potassium salt, phenolphthalein, phenothiazine, saccharin and its salts, tetraphenylmethane, triphenylene, triphenylmethanol, and also mixtures of at least two of those substances. The planparall platelets obtained by said process have typically a thickness of 30 to 500 nm and a diameter of from 5 to 50 μm.

WO06/021528 relates to a process for the production of plane-parallel platelets, comprising the steps:
a) vapour-deposition of a separating agent onto a carrier to produce a separating agent layer,
b) vapour-deposition of at least one product layer onto the separating agent layer, and
c) dissolution of the separating agent layer in a solvent and production of a suspension in which the at least one product layer is present in the form of plane-parallel platelets, wherein the separating agent is selected from the group consisting of anthracene, anthraquinone, acetamidophenol, acetylsalicylic acid, camphoric anhydride, benzimidazole, benzene-1,2,4-tricarboxylic acid, biphenyl-2,2-dicarboxylic acid, bis(4-hydroxyphenyl)sulfone, dihydroxyanthraquinone, hydantoin, 3-hydroxybenzoic acid, 8-hydroxyquinoline-5-sulfonic acid monohydrate, 4-hydroxycoumarin, 7-hydroxycoumarin, 3-hydroxynaphthalene-2-carboxylic acid, isophthalic acid, 4,4-methylene-bis-3-hydroxynaphthalene-2-carboxylic acid, naphthalene-1,8-dicarboxylic anhydride, phthalimide and its potassium salt, phenolphthalein, phenothiazine, saccharin and its salts, tetraphenylmethane, triphenylene, triphenylmethanol, and also mixtures of at least two of those substances, especially pentaerythritol ($C(CH_2OH)_4$), trimesic acid (=1,3,5 bezene tricarboxylic acid), DL-alanine, DL-valine, 2,6-diaminopurine, ascorbic acid, 1,3,5-benzenetricarboxylic acid, o-acetylsalicyclic acid, diphenic acid, terephthalic acid, pyrogallol, cyanuric acid, hexamethyltetramine (urotropin), fumaric acid, and 4-acetylbenzoic acid and also mixtures of at least two of those substances.

WO07/057328 discloses a process for the production of plane-parallel platelets, comprising the steps:
a) deposition of a separating agent I, which is dissolvable in water, onto a carrier to produce a separating agent layer,
b) vapour-deposition of a separating agent II, which is not dissolvable in water, onto the separating agent layer of step a),
c) vapour-deposition of at least one product layer onto the separating agent layer of step b), and
d) vapour-deposition of a separating agent II, which is not dissolvable in water, onto the product layer of step c),
e) dissolution of the separating agent layer of step a) in water and production of a suspension in which the at least one product layer is present in the form of plane-parallel platelets, the top surface and the bottom surface, but not the side surfaces of which are covered by the separating agent II, and
f) dissolution of the separating agent layer of steps b) and d) in a solvent and production of a suspension in which the product, comprising at least one layer, is present in the form of plane-parallel platelets.

The aluminium flakes described in WO06/021528 and WO07/057328 have an average diameter of at least 2 μm, especially from 2 to 20 μm, more especially from 3 to 15 μm, and most preferred from 5 to 15 μm. The thickness of the aluminium flakes is generally from 10 to 150 nm, especially from 10 to 100 nm, and more especially from 30 to 60 nm.

WO2005/051675 relates to a method for forming a (security) product comprising the steps of:
a) providing a sheet of base material, said sheet having an upper and lower surface;
b) depositing a metallic ink on at least a portion of the sheet of base material; and
c) forming a diffraction grating on at least a portion of the metallic ink, wherein the optical density of metallic ink when deposited is in the range of 0.2 to 0.8.

The average pigment particle diameter is in the range 8-15 μm and the thickness of the pigment particles is in the range 10-50 nm, especially 19-21 nm.

WO2005/049745 discloses a coating composition for use in coating a diffraction grating, comprising metal pigment particles and a binder wherein the ratio of pigment to binder is sufficiently high as to permit the alignment of the pigment particles to the contours of the diffraction grating. Preferably, the thickness of the pigment particles is less than 50 nm. More preferably, the thickness of pigment particle is less than 35 nm. More preferably still, the thickness of pigment particle is less than 20 nm. Even more preferably still, the thickness of pigment particle is in the range 5-18 nm. In one embodiment of WO2005/049745, the thickness of the pigment particles is in the range 10-50 nm. In another embodiment, the thickness of pigment particle is in the range 10-30 nm. In another embodiment, the average thickness of pigment particle is 17 nm. In another embodiment, the average thickness of pigment particle is 12.5 nm.

It is the object of the present invention to provide aluminium flakes which, when used in coating a hologram result in products showing an extremly bright OVD image and extremly strong rainbow effect, high purity and contrast.

Said object has been solved by aluminium flakes having a thickness above 5 nm and below 10 nm.

Preferably, the aluminium flakes have a thickness between 7 and 9 nm.

The mean particle diameter may be in the range of 2 to 20 μm. The mean particle diameter is preferably in the range of 5 to 20 μm, more preferably 8 to 15 μm, even more preferably 9 to 10 μm as measured by a laser diffraction instrument (Coulter LS130).

The optical density may be in the range of 0.16 to 0.24 as measured on the McBeth densitometer. Preferably, the range is 0.18 to 0.22. More preferably, the optical density is 0.2 as measured on the McBeth densitometer.

The aluminium flakes of the present invention can be used for the preparation of coating compositions. Accordingly, the present invention relates also to coating compositions, comprising the aluminium flakes of the present invention.

The coating compositions comprise the aluminium flakes of the present invention and a binder. The ratio of pigment to binder is sufficiently high as to permit the alignment of the pigment particles to the contours of the diffraction grating.

The binder is a high-molecular-weight organic compound conventionally used in coating compositions. The high molecular weight organic material for the pigmenting of which the pigments or pigment compositions according to the invention may be used may be of natural or synthetic origin. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

Advantageously, the coating composition further comprises a solvent.

The binder may comprise any one or more selected from the group comprising nitrocellulose, ethyl cellulose, cellulose acetate, cellulose acetate propionate (CAP), cellulose acetate butyrate (CAB), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polyethyleneterephthalate, terpene phenol, polyolefin, silicone, cellulose, polyamide, polyester and rosin ester resins.

A colour change can be obtained by changing the pigment/binder ratio. A low pigment/binder ratio (1:10 to 1:20) results in a deep bluish grey colour, whereas a higher pigment/binder ratio (1:1 to 1:0.5) gives a yellowish gold colour. For pigment/binder ratios inbetween the colour can be seen to gradually shift from bluish grey to yellowish gold.

The coating composition is preferably a printing ink. The ink according to the present invention comprises, as in the case of an ordinary printing ink, the aluminium pigment, a binder, an auxiliary agent, and the like.

With respect to the binder resin, a thermoplastic resin may be used, examples of which include, polyethylene based polymers [polyethylene (PE), ethylene-vinyl acetate copolymer (EVA), vinyl chloride-vinyl acetate copolymer, vinyl alcohol-vinyl acetate copolymer, polypropylene (PP), vinyl based polymers [poly(vinyl chloride) (PVC), poly(vinyl butyral) (PVB), poly(vinyl alcohol) (PVA), poly(vinylidene chloride) (PVdC), poly(vinyl acetate) (PVAc), poly(vinyl formal) (PVF)], polystyrene based polymers [polystyrene (PS), styrene-acrylonitrile copolymer (AS), acrylonitrile-butadiene-styrene copolymer (ABS)], acrylic based polymers [poly(methyl methacrylate) (PMMA), MMA-styrene copolymer], polycarbonate (PC), celluloses [ethyl cellulose (EC), cellulose acetate (CA), propyl cellulose (CP), cellulose acetate butyrate (CAB), cellulose nitrate (CN)], fluorin based polymers [polychlorofluoroethylene (PCTFE), polytetrafluoroethylene (PTFE), tetrafluoroethylene-hexafluoroethylene copolymer (FEP), poly(vinylidene fluoride) (PVdF)], urethane based polymers (PU), nylons [type 6, type 66, type 610, type 11], polyesters (alkyl) [polyethylene terephthalate (PET), polybutylene terephthalate (PBT), polycyclohexane terephthalate (PCT)], novolac type phenolic resins, or the like. In addition, thermosetting resins such as resol type phenolic resin, a urea resin, a melamine resin, a polyurethane resin, an epoxy resin, an unsaturated polyester and the like, and natural resins such as protein, gum, shellac, copal, starch and rosin may also be used.

Furthermore, to the binder, a plasticizer for stabilizing the flexibility and strength of the print film and a solvent for adjusting the viscosity and drying property thereof may be added according to the needs therefor. The solvent may comprise any one or more of an ester, such as n-propyl acetate, iso-propyl acetate, ethyl acetate, butyl acetate; an alcohol, such as ethyl alcohol, industrial methylated spirits, isopropyl alcohol or normal propyl alcohol; a ketone, such as methyl ethyl ketone or acetone; an aromatic hydrocarbon, such as xylene and toluene. A solvent of a low boiling temperature of about 100° C. and a petroleum solvent of a high boiling temperature of 250° C. or higher, may be used according to the type of the printing method. An alkylbenzene or the like, for example may be used as a solvent of a low boiling temperature. Examples of solvents are ethoxypropanol, methylethylketon, methoxypropylacetate, diacetonalcohol etc.

Further in addition, an auxiliary agent including a variety of reactive agents for improving drying property, viscosity, and dispersibility, may suitably be added. The auxiliary agents are to adjust the performance of the ink, and for example, a compound that improves the abrasion resistance of the ink surface and a drying agent that accelerates the drying of the ink, and the like may be employed.

A photopolymerization-curable resin or an electron beam curable resin wherein a solvent is not used may also be employed as a binder resin that is a principal component of the vehicle. The examples thereof include an acrylic resin, and specific examples of acrylic monomers commercially available are shown below.

A monofunctional acrylate monomer that may be used includes for example, 2-ethylhexyl acrylate, 2-ethylhexyl-EO adduct acrylate, ethoxydiethylene glycol acrylate, 2-hydroxyethyl acrylate, 2-hydroxypropyl acrylate, 2-hydroxyethyl acrylate-caprolactone adduct, 2-phenoxyethyl acrylate, phenoxydiethylene glycol acrylate, nonyl phenol-EO adduct acrylate, (nonyl phenol-EO adduct)-caprolactone adduct acrylate, 2-hydroxy-3-phenoxypropyl acrylate, tetrahydrofurfuryl acrylate, furfuryl alcohol-caprolactone adduct acrylate, acryloyl morpholine, dicyclopentenyl acrylate, dicyclopentanyl acrylate, dicyclopentenyloxyethyl acrylate, isobornyl acrylate, (4,4-dimethyl-1,3-dioxane)-caprolactone adduct acrylate, (3-methyl-5,5-dimethyl-1,3-dioxane)-caprolactone adduct acrylate, and the like.

A polyfunctional acrylate monomer that may be used includes hexanediol diacrylate, neopentyl glycol diacrylate, polyethylene glycol diacrylate, tripropylene glycol diacrylate, neopentyl glycol hydroxypivalate diacrylate, (neopentyl glycol hydroxypivalate)-caprolactone adduct diacrylate, (1,6-hexanediol diglycidyl ether)-acrylic acid adduct, (hydroxypivalaldehyde-trimethylolpropane acetal)diacrylate, 2,2-bis[4-(acryloyloxydiethoxy)phenyl]propane, 2,2-bis[4-(acryloyloxydiethoxy)phenyl]methane, hydrogenated bisphenol A-ethylene oxide adduct diacrylate, tricyclodecanedimethanol diacrylate, trimethylolpropane triacrylate, pentaerythritol triacrylate, (trimethylolpropane-propylene oxide) adduct triacrylate, glycerine-propylene oxide adduct triacrylate, a mixture of dipentaerithritol hexaacrylate and pentaacrylate, esters of dipentaerithritol and lower fatty acid and acrylic acid, dipentaerithritol-caprolactone adduct acrylate, tris(acryloyloxyethyl) isocyanurate, 2-acryloyloxyethyl phosphate, and the like.

Inks comprising the above resins are free of solvent and are so constituted as to polymerize in chain reaction upon irradiation by an electron beam or electromagnetic waves.

With respect to inks of ultraviolet-irradiation type among these inks, a photopolymerization initiator, and depending on the needs therefor, a sensitizing agent, and auxiliary agents such as a polymerization inhibitor and a chain transfer agent, and the like may be added thereto.

With respect to photo-polymerization initiators, there are, (1) an initiator of direct photolysis type including an arylalkyl ketone, an oxime ketone, an acylphosphine oxide, or the like, (2) an initiator of radical polymerization reaction type including a benzophenone derivative, a thioxanthone derivative, or the like, (3) an initiator of cationic polymerization reaction type including an aryl diazonium salt, an aryl iodinium salt, an aryl sulfonium salt, and an aryl acetophenone salt, or the like, and in addition, (4) an initiator of energy transfer type, (5) an initiator of photoredox type, (6) an initiator of electron transfer type, and the like. With respect to the inks of electron beam-curable type, a photopolymerization initiator is not necessary and a resin of the same type as in the case of the ultraviolet-irradiation type inks can be used, and various kinds of auxiliary agent may be added thereto according to the needs therefor.

The inks comprise a total content of aluminum pigment of from 0.1 to 20% by weight, preferably 0.1-10% by weight based on the total weight of the ink.

Preferably, the binder comprises 50% nitrocellulose in conjunction with any above mentioned resin.

The composition may additionally comprise a solvent. The solvent may be ester/alcohol blends and preferably normal propyl acetate and ethanol. More preferably, the ester/alcohol blend is in a ratio of between 10:1 and 40:1, even more preferably 20:1 to 30:1.

The solvent used in the metallic ink may comprise any one or more of an ester, such as n-propyl acetate, iso-propyl acetate, ethyl acetate, butyl acetate; an alcohol, such as ethyl alcohol, industrial methylated spirits, isopropyl alcohol or normal propyl alcohol; a ketone, such as methyl ethyl ketone or acetone; an aromatic hydrocarbon, such as toluene, and water.

The average particle diameter of the aluminium flakes may be in the range of 2 to 20 µm. The average particle diameter is preferably in the range of 5.0 to 15.0 µm, more preferably 8 to 15 µm, even more preferably 7 to 11 µm in diameter as measured by a laser diffraction instrument (Coulter LS130).

Preferably, the composition is used in the manufacture of a hologram. Reference is made to WO2005/051675 and WO2008/061930. The method described therein for forming an optically variable image (an optically variable device), especially a holographic diffraction grating, on a substrate comprises the steps of:
a) forming an optically variable image (OVI) on a discrete portion of the substrate; and
b) depositing the metallic ink of the present invention on at least a portion of the diffraction grating.

Preferably, the method comprises the steps of:
a) applying a curable compound to at least a portion of the substrate;
b) contacting at least a portion of the curable compound with OVI forming means;
c) curing the curable compound and
d) depositing the metallic ink of the present invention on at least a portion of the cured compound.

Referring to FIG. 1 of WO08/061930, paper, aluminium, or another opaque substrates (1) is printed with an ultra violet curable lacquer (2) on its lower surface. An optically variable device or other lens or engraved structure is cast (3) into the surface of the lacquer (2) with a clear shim (4) having the optically variable device or other lens or engraved structure thereon. The optically variable device or other lens or engraved structure image is imparted into the lacquer and instantly cured (6) via an UV lamp disposed through the shim (4) at normal processing speeds through polarizing lens (8), quartz roller (6), and clear polycarbonate roller (5). The optically variable device or other lens or engraved structure image is a facsimile of the image on the clear shim. Metallic ink (9) is printed (10) over the optically variable device or other lens or engraved structure and causes the optically variable device or other lens or engraved structure to become light reflective. Further colours (11) can be subsequently conventionally printed in-line at normal printing process speeds. In an alternative embodiment, the paper, aluminium, and all manner of other opaque substrate (1) is replaced with a filmic substrate. Such material is substantially transparent and therefore the image is visible from both sides of the surface.

The (security) product obtainable by using the above method is new and forms a further subject of the present application.

In a preferred embodiment of the present invention a coloured, or metallic ink is deposited on a substrate, on which the optically variable image is formed; before forming the optically variable image on at least a portion of the coloured, or metallic ink.

The substrate may comprise any sheet material. The substrate may be opaque, substantially transparent or translucent, wherein the method described in WO08/061930 is especially suited for substrates, which are for opaque to UV light (non-transparent). The substrate may comprise paper, leather, fabric such as silk, cotton, tyvac, filmic material or metal, such as aluminium. The substrate may be in the form of one or more sheets or a web.

The substrate may be mould made, woven, non-woven, cast, calendared, blown, extruded and/or biaxially extruded.

The substrate may comprise paper, fabric, man made fibres and polymeric compounds. The substrate may comprise any one or more selected from the group comprising paper, papers made from wood pulp or cotton or synthetic wood free fibres and board. The paper/board may be coated, calendared or machine glazed; coated, uncoated, mould made with cotton or denim content, Tyvac, linen, cotton, silk, leather, polyethyleneterephthalate, polypropylene propa-film, polyvinylchloride, rigid PVC, cellulose, tri-acetate, acetate polystyrene, polyethylene, nylon, acrylic and polytherimide board. The polyethyleneterephthalate substrate may be Melienex type film orientated polypropylene (obtainable from DuPont Films Willimington Del. product ID Melinex HS-2).

The substrate may comprise papers and board made from wood pulp or cotton or synthetic wood free fibres. The paper/board may be coated, calendared or machine glazed.

The substrates being transparent filmic or non transparent substrates like opaque plastic, paper including but not limited to banknote, voucher, passport, and any other security or fiduciary documents, self adhesive stamp and excise seals, card, tobacco, pharmaceutical, computer software packaging and certificates of authentication, aluminium, and the like.

In a preferred embodiment of the present invention the substrate is a non-transparent (opaque) sheet material, such as, for example, paper. In another preferred embodiment of the present invention the substrate is a transparent sheet material, such as, for example, polyethyleneterephthalate.

The forming of an optically variable image on the substrate may comprise depositing a curable compound, or composition on at least a portion of the substrate. The composition, generally a coating or lacquer may be deposited by means of gravure, flexographic, ink jet and screen process printing. The curable lacquer may be cured by actinic radiations, preferably ultraviolet (U.V.) light or electron beam. Preferably, the lacquer is UV cured. UV curing lacquers can be obtained from Ciba Specialty Chemicals. The lacquers exposed to actinic radiations or electron beam used in the present invention are required to reach a solidified stage when they separate again from the imaging shim in order to keep the record in their upper layer of the sub-microscopic, holographic diffraction grating image or pattern (OVI). Particularly suitable for the lacquers compositions are chemistries used in the radiation curable industries in industrial coatings and graphic arts. Particularly suitable are compositions containing one or several photo-latent catalysts that will initiate polymerization of the exposed lacquer layer to actinic radiations. Particularly suitable for fast curing and conversion to a solid state are compositions comprising one or several monomers and oligomers sensitive to free-radical polymerization, such as acrylates, methacrylates or monomers or/and oligomers, containing at least one ethylenically unsaturated group. Reference is made to WO2008/061930.

The curable composition is preferably deposited by means of gravure or flexographic printing.

The curable composition is preferably curable by means of an ultraviolet (U.V.) light or an electron beam. The curable composition can be coloured.

The metallic ink may be applied to the substrate by means of conventional printing press such as gravure, rotogravure, flexographic, lithographic, offset, letterpress intaglio and/or screen process, or other printing process.

In order that the hologram is clearly visible on both the first and second surface of a clear filmic substrate and the first surface of a paper substrate, preferably, the metallic pigment particles are printed in such a way as to align themselves such that they follow and conform to the contours of the diffraction grating.

To accomplish this alignment of metal pigment flakes to the contours of the diffraction grating the coating composition preferably has a very low binder, a low pigment content and a medium pigment to binder ratio and/or very thin pigment particles.

The coating composition preferably comprises low solids, high viscosity binders. Preferably, the pigment to binder ratio is in the range of 2:1 to 1:3 by weight. More preferably, the pigment to binder ratio is by weight in the range of 1.5:1 to 1:1, and even more preferably 1:1 to 1.5:1. Most preferably the pigment to binder ratio is 1:3.

The binder may comprise any one or more selected from the group comprising nitro cellulose, vinyl chloride, vinyl acetate copolymers, vinyl, acrylic, urethane, polyethyleneterephthalate, terpene phenol, polyolefin, silicone, cellulose, polyamide, polyester, rosin ester resins. The preferred binder is 50% nitrocellulose (ID nitrocellulose DHL120/170 and nitrocellulose DLX30/50 supplied by Nobel Industries) 50% polyurethane (ID Neorez U335 supplied by Avecia). The solvents may be ester/alcohol blends and preferably normal propyl acetate and ethanol in a ratio of 20:1 to 30:1.

The compositions of the present invention can be applied to optically variable images (holograms) for use on substrates such as (security products), including banknotes, credit cards, identification documents like passports, identification cards, drivers licenses, or other verification documents, pharmaceutical apparel, software, compact discs, tobacco packaging and other products or packaging prone to counterfeiting or forgery, to protect them from fraudulent conversion, diversion or imitation.

The thickness of the pigment particles may be less than 10 nm. The thickness of the pigment particles may be above 5 nm.

Preferably, the thickness of the pigment particles is between 7 and 9 nm. More preferably, the thickness of pigment particle is about 8 nm.

Preferably, when the substrate carrying the metallised image or pattern is subsequently over-laid onto printed pictures and/or text, or the substrate is pre-printed with pictures and/or text and the metallised image or pattern is deposited thereon those pre-printed features are visible through the substrate and/or the metallic composition coated diffraction grating or image.

The coating compositions of the present invention may be deposited on a diffraction grating disposed on a substrate such as a substantially transparent, translucent, or opaque substrate. The substrate may comprise paper, filmic material or metal, such as aluminium.

The substrate may comprise polymeric compounds. The substrate may comprise papers made from wood pulp or cotton or synthetic wood-free fibres.

The diffraction grating may be formed using any methods known to the skilled man such as those described in U.S. Pat. No. 4,913,858, U.S. Pat. No. 5,164,227, WO2005/051675 and WO2008/061930.

The coating composition of the present invention may be applied to the substrate by means of conventional printing press such as gravure, rotogravure, flexographic, lithographic, offset, letterpress intaglio and/or screen process, or other printing process.

Preferably, when the substrate carrying the enhanced diffractive image or pattern is subsequently over-laid onto printed pictures and/or text, or the substrate is pre-printed with pictures and/or text and the enhanced diffractive image or pattern is deposited thereon, those printed features are visible through the substrate and/or the metallic ink coated diffraction grating or image.

By varying the film-weight and density of the deposited metallic ink, the transmission of light through the enhanced image can be adjusted to provide a desirable range of visual effects.

The composition may further comprise modifying additives, for example colorants and/or suitable solvent (s).

Preferably, the resin maintains adhesion of the composition to the surface of the diffraction grating.

Specific additives can be added to the composition to modify its chemicals and/or physical properties. Polychromatic effects can be achieved by the introduction of transparent organic pigments and/or solvent soluble dyestuffs into the ink, to achieve a range of coloured shades.

The binder resins may be initially dissolved in the appropriate solvent(s) to form liquid varnishes. These varnishes can then be blended together with the metallic pigment and/or other components by means of a high-speed blender to produce the composition.

In accordance with a further aspect of the present invention, there is provided a metallic ink comprising the aluminium flakes of the present invention and a binder. The ratio of pigment to binder is sufficiently high as to permit the alignment of the aluminum particles to the contours of a diffraction grating.

The aluminium particles may be prepared by any means known to the skilled man. Reference is made to GB-A-1, 465,908 (U.S. Pat. No. 4,116,710), U.S. Pat. No. 4,321,087, WO0024946, WO0024946, WO020090613, WO03046245, WO02/094945, WO06/021528, WO07/057328 and WO2005/049745. Preferably, a 12-micron thick transparent carrier film such as Polythyleneterephthalate obtained from DuPont Films Wilmington. Del. (Product ID Melinex HS-2) two meters wide is gravure coated with an acrylic resin isobutyl methacrylate obtained from DuPont (Product ID Elvacite 2045) and dried by means of hot air. In a second operation the acrylic-coated film is deposition coated with aluminium by means of a roll to roll vacuum chamber. The deposition rate and thickness of the vaporised aluminium layer over the printed acrylic coating is accurately controlled through continuos monitoring of the optical density during manufacture. The operating range of vacuum deposition may be in the range of 7 to 9 nm.

The optical density may be in the range of 0.16 to 0.24 as measured on the McBeth densitometer. Preferably, the range is 0.18 to 0.22. More preferably, the optical density is 0.2 as measured on the McBeth densitometer.

The aluminium layer may be removed from the carrier film by means of desolving the acrylic supporting layer in a bath containing ethyl acetate releasing the aluminium layer from the carrier film. The resulting aluminium in the form of a coarse flake in the resin solution may then be washed in a multi stage centrifuging process to remove the acrylic resin. The coarse aluminium flakes are mixed with ethyl acetate and disintegrated by a high shear mixing process to produce a controlled particle size distribution. The median particle diameter may be in the range of 5 to 12 microns the preferred range being 7 to 9 microns diameter as measured by a Coulter LS130 I. a. s. e. r. diffraction granulometer.

The metallic ink of the present invention can also be used in the production of a hot stamping foil.

Accordingly, the present invention is also directed to a method of producing a hot stamping foil comprising the steps of:
(a) coating a carrier with a release coating,
(b) applying a coating of a hard lacquer onto the release coating,
(c) applying an ultraviolet primer coating onto the coating of the hard lacquer,
(d) contacting at least a portion of the ultraviolet primer coating with optically variable image (optically variable device) forming means;
(e) depositing the metallic ink of the present invention to the UV primer holding the transferred optically variable device either as a whole or in partial areas,
(f) optionally printing subsequently process colours, and
(g) applying a heat activated adhesive onto the layer obtained in step e), or f).

Examples of the release compound are silica, microcrystalline wax, rice wax, oricuri wax, stearic acid esters, polyglycols, and metallic salts of fatty acids.

Examples of the coating of the hard lacquer are polymethylmethacrylate, styrene acrylonitrile, polyethyleneterephthalate, nitrocellulose, or mixtures thereof. The coating of the hard lacquer affixed to said release coating has in general a thickness in the range 0.25 microns to 9 microns and has a glass transition temperature of at least 70° C.

Examples of the adhesive compound are vinyl alcohol, polyacrylates, polyalkacrylates, vinyl resins, polyvinyl acetate, cellulose resins, polyacrylamides, and ethylene/vinyl acetate copolymers.

Under the present invention a carrier film substrate having the thickness on the order of 12 microns to 75 microns and formed of a suitable plastic material such as a polyester, oriented polypropylene or other suitable material is coated with a release coating such as a microcrystalline wax or a partially saponified montan wax or other wax based coatings having a thickness in the range of 0.025 microns to 5 microns and then has a coating of hard lacquer applied over the release coating in a thickness in the range of 0.25 microns to 10 microns. The hard lacquer coating may be applied by a gravure roller following which is dried an ultraviolet primer coating having the thickness in a range of 0.3 microns to 9 microns is then applied by means of a gravure roller. An optically variable device is contacted by the embossing shim having an optically variable device thereon and is transferred into the surface of the UV lacquer and cured by UV light. A layer of the vacuum metallised aluminium ink is applied to the UV primer holding the transferred optically variable device either as a whole or in partial areas. Subsequent process colours can be gravure printed.

The hot stamping foil obtained in the above process can be used to label an article of manufacture. The method of labeling the article of manufacture comprises the steps of: contacting the heat activated adhesive layer of the hot stamping foil obtained according to the above process with said article; hot stamping said hot stamping foil to cause said heat activated adhesive layer to adhere to said article; and removing the carrier of said hot stamping foil from said hard lacquer layer.

The optically variable device (OVD) is, for example, an diffractive optical variable image (DOVI). The term "diffractive optical variable image" as used herein may refer to any type of holograms including, for example, but not limited to a multiple plane hologram (e.g., 2-dimensional hologram, 3-dimensional hologram, etc.), a stereogram, and a grating image (e.g., dot-matrix, pixelgram, exelgram, kinegram, etc.).

Examples of an optically variable image or device are holograms or diffraction gratings, moire grating, etc. These optical microstructured images are composed of a series of structured surfaces. These surfaces may have straight or curved profiles, with constant or random spacing, and may even vary from microns to millimeters in dimension. Patterns may be circular, linear, or have no uniform pattern. For example a Fresnel lens has a microstructured surface on one side and a pano surface on the other. The microstructured surface consists of a series of grooves with changing slope angles as the distance from the optical axis increases. The draft facets located between the slope facets usually do not affect the optical performance of the Fresnel lens.

Various aspects and features of the present invention will be further discussed in terms of the examples. The following examples are intended to illustrate various aspects and features of the present invention, but not to limited the scope of the present invention.

EXAMPLES

Example 1

A 12-micron thick transparent carrier film, two meters wide, made of polythyleneterephthalate was obtained from ICI Films, Wilmington, Del., USA (Melinex HS-2) is gravure coated with an acrylic resin, isobutyl methacrylate, obtained from DuPont (Elvacite 2045), and dried by means of hot air. In a second operation the acrylic-coated film is deposition coated with aluminium by means of a roll to roll vacuum chamber. The deposition rate and thickness of the vaporised aluminium layer over the printed acrylic coating are accurately controlled through continuous monitoring of the optical density during manufacture (The aluminum layer is vapor deposited at 8-9 nm measured by an IC/5 controller. The controller for the aluminum layer is calibrated by a MacBeth TR927 transmission densitometer with green filter). Several rolls were metallised at different thicknesses of aluminium, in order to give flake products of various thicknesses (see Table below).

| Product | d50 | Thickness*) | Optical Density**) |
|---|---|---|---|
| Product A) | 7.0-11.0 μm | 8-9 nm | 0.2 |
| Comparative Product B) (WO2005/049745) | 8.5-11.5 μm | 17 nm | 0.7 |

*)Flake thickness measured directly by sectioning and SEM, or via Atomic Force Microscopy.
**)Optical density of the vaporised aluminium layer over the printed acrylic coating measured by the Macbeth Densitometer (X-Rite 301 Transmission Densitometer) during manufacture.

The aluminium layer is removed from the carrier film by means of dissolving the acrylic supporting layer in a bath containing ethyl acetate, releasing the aluminium layer from the carrier film. The resulting aluminium, in the form of a coarse flake in the resin solution, is then washed in a multi stage centrifuging process to remove the acrylic resin. The coarse aluminium flakes were mixed with ethyl acetate and disintegrated by a high shear mixing process to produce a controlled particle size distribution.

The suspension of vacuum metallised aluminium flakes (Product A), or Comparative Product B)) in ethyl acetate is mixed with nitrocellulose, n-propylacetate and Dowanol PM to make a coating composition.

The coatings are printed on an RK proofer press over an aluminum foil, and white coated papered paper provided with a holographic image by applying a clean UV curable varnish onto the corona treated substrate and embossing by using a shim and exposing to UV light. Product A) is extremely darker than Comparative Product B).

While Comparative Product B) shows bright OVD image and good rainbow effect, product A) is characterized by an extremely bright OVD image and extremely strong rainbow effect, high purity and contrast.

Application Example 1

1a) Varnish preparation: 14.3 g of nitrocellulose (DHM 10-25 IPA (Nobel Entreprises, UK)) are slowly added to 85.7 g of ethylacetate (99-100% rein, Brenntag) in a 250 mL glass bottle and gently stirred until complete dissolution at room temperature. Solid content measurements are then performed and quantity of ethylacetate is adjusted to achieve a value of 10% solid content in the varnish preparation.

1 b) 2.25 g of the above prepared varnish, 1.23 g of nitrocellulose (DHX3/5 ETH (Nobel Enterprises, UK)) and 0.34 g of methacrylate resin (DEGALAN 4793-L (EVONIK Industries Degussa)) are mixed with 5.4 g of ethylacetate in a 25 mL glass bottle and slowly stirred with a Dispermat apparatus at 2000 rpm for 5 min. Addition of 0.8 g of the aluminium flakes of example 1 and stirring with a Dispermat at 800 rpm for 10 min affords a metallic ink which is printed by hand-coater (HC2, 12 μm wet film thickness) on contrast paper and transparent PET film.

Application Example 2

2.00 g of the varnish prepared in the application example 1a, 1.09 g of nitrocellulose (DHX3/5 ETH (Nobel Enterprises, UK)) and 0.30 g of methacrylate resin (DEGALAN 4793-L (EVONIK Industries Degussa)) are mixed with 4.8 g of ethylacetate in a 25 mL glass bottle and slowly stirred with a Dispermat apparatus at 2000 rpm for 5 min. Addition of 1.8 g of the aluminium flakes of example 1 and stirring with a Dispermat at 800 rpm for 10 min affords a metallic ink which is printed by hand-coater (HC2, 12 μm wet film thickness) on contrast paper and transparent PET film.

Application Example 3

1.76 g of the varnish prepared in application example 1a, 0.96 g of nitrocellulose (DHX3/5 ETH (Nobel Enterprises, UK)) and 0.26 g of methacrylate resin (DEGALAN 4793-L (EVONIK Industries Degussa)) are mixed with 4.2 g of ethylacetate in a 25 mL glass bottle and slowly stirred with a Dispermat apparatus at 2000 rpm for 5 min. Addition of 2.8 g of the aluminium flakes of example 1 and stirring with a Dispermat at 800 rpm for 10 min affords a metallic ink which is printed by hand-coater (HC2, 12 μm wet film thickness) on contrast paper and transparent PET film.

Application Example 4

1.24 g of the varnish prepared in application example 1a, 0.68 g of nitrocellulose (DHX3/5 ETH (Nobel Enterprises, UK)) and 0.18 g of methacrylate resin (DEGALAN 4793-L (EVONIK Industries Degussa)) are mixed with 2.98 g of ethylacetate in a 25 mL glass bottle and slowly stirred with a Dispermat apparatus at 2000 rpm for 5 min. Addition of 3.8 g of the aluminium flakes of example 1 and stirring with a Dispermat at 800 rpm for 10 min affords a metallic ink which is printed by hand-coater (HC2, 12 μm wet film thickness) on contrast paper and transparent PET film.

Coloristic measurements are performed with an X-Rite SP68 (d/8) spectrophotometer on each white and black part of the contrast paper. CieLab L*, a*, b* coordinates are given for a D65 standard illuminant and 10° observer angle.

| Application Example | Pigment/Binder | Contrast Paper | L* | a* | b* |
|---|---|---|---|---|---|
| 1 | 0.12/1 | white | 48.4 | 0.6 | 0.1 |
| 2 | 0.30/1 | white | 48.1 | 0.9 | 1.3 |
| 3 | 0.54/1 | white | 50.9 | 2.3 | 7.6 |
| 4 | 1.03/1 | white | 56.2 | 2.2 | 11.0 |
| 1 | 0.12/1 | black | 48.7 | −0.3 | −0.7 |
| 2 | 0.30/1 | black | 48.2 | 0.2 | 0.0 |
| 3 | 0.54/1 | black | 49.5 | 2.1 | 5.6 |
| 4 | 1.03/1 | black | 54.1 | 2.4 | 9.8 |

Observation of the prints on transparent PET film reveals a gold shade upon direct viewing and a darker bronze-gold shade upon reverse viewing (through PET film).

Application Example 5—Pigment:Binder Ratio 1:5, Total Non-Volatile Content 2.4%

10% Cellulose Acetate Butyrate (CAB) Solution:

| | |
|---|---|
| CAB (e.g. CAB 381-20 supplied by Eastman) | 10% by weight |
| n-Butyl acetate | 45% by weight |
| Xylene (mixed isomers) | 45% by weight |
| Σ | 100% by weight |

25% Polyester Resin Solution:

| | |
|---|---|
| Polyester resin (e.g. Setal 173-VS-60 supplied by Nuplex Resins) | 42% by weight |
| n-Butyl acetate | 29% by weight |
| Xylene (mixed isomers) | 29% by weight |
| Σ | 100% by weight |

4.0 g of a 10% slurry of the aluminium flakes of example 1 are added to 10.0 g of a 10% CAB solution, 4.0 g of a polyester resin solution, 41.0 g n-butyl acetate and 41.0 g xylene (mixed isomers) and mixed under low shear conditions (magnetic stirrer or low speed propeller stirrer) until a fully 'wetted-out' homogeneous liquid slurry is obtained.

The sample is best applied onto a substrate at full opacity (applied over black & white substrate or with black & white marker to ensure opacity) by use of pneumatic or electrostatic spray application (draw-down, pour or other conventional application techniques could also be used with some variation in appearance) and then following a 'flash-off' period either at room temperature or under mild forced conditions (flash-off period is the time allowed for solvent to be released from the coating prior to further processing and can be with or without curing of the film), a 1-component stoving clearcoat is applied (use of 1-component or 2-component clearcoats are both feasible) and again after a further 'flash-off' period the whole article is cured at elevated temperature to bring about the final film properties.

Application Example 6—Pigment:Binder Ratio 1:3, Total Non-Volatile Content 2.4%

6.0 g of a 10% slurry of the aluminium flakes of example 1 is added to 9.0 g of a 10% CAB solution, 3.6 g of a polyester resin solution, 40.7 g n-butyl acetate and 40.7 g xylene (mixed isomers) and mixed under low shear conditions (magnetic stirrer or low speed propeller stirrer) until a fully 'wetted-out' homogeneous liquid slurry was obtained. Application conditions are the same as for application example 5.

Application Example 7—Pigment:Binder Ratio 1:1, Total Non-Volatile Content 2.4%

12.0 g of a 10% slurry of the aluminium flakes of example 1 are added to 6.0 g of a 10% CAB solution, 2.4 g of a polyester resin solution, 39.8 g n-butyl acetate and 39.8 g xylene (mixed isomers) and mixed under low shear conditions (magnetic stirrer or low speed propeller stirrer) until a fully 'wetted-out' homogeneous liquid slurry is obtained. Application conditions are the same as for application example 5.

Application Example 8—Pigment:Binder Ratio 1:0.5, Total Non-Volatile Content 2.4%

16.0 g of a 10% slurry of the aluminium flakes of example 1 are added to 4.0 g of a 10% CAB solution, 1.60 g of a polyester resin solution, 39.2 g n-butyl acetate and 39.2 g xylene (mixed isomers) and mixed under low shear conditions (magnetic stirrer or low speed propeller stirrer) until a fully 'wetted-out' homogeneous liquid slurry was obtained. Application conditions are the same as for application example 5.

Coloristic measurements are performed with a Minolta CM-2600D (d/8) spectrophotometer. Opacity is ensured by comparing DE values when measured over the white and black substrate. CieLab L*, a*, b* values are given with D65/10 illumination.

| Application Example | Pigment/Binder | Opacity over black & white | L* | a* | b* |
|---|---|---|---|---|---|
| 5 | 1:5 | Yes | 52.2 | 0.8 | 3.7 |
| 6 | 1:3 | Yes | 55.5 | 1.2 | 4.9 |
| 7 | 1:1 | Yes | 61.4 | 1.4 | 8.8 |
| 8 | 1:0.5 | Yes | 66.3 | 0.9 | 8.8 |

The invention claimed is:

1. A method for forming an an optically variable device on a substrate comprising the steps of:
    a) forming a holographic diffraction grating on a discrete portion of the substrate; and
    b) depositing a metallic ink on at least a portion of the diffraction grating, wherein the metallic ink comprises aluminum flakes having a thickness between 7 and 9 nm and a mean particle diameter D50 in the range of 9 to 10 μM and a binder,
    wherein the ratio of pigment to binder is sufficiently high to permit the alignment of the pigment particles to the contours of a diffraction grating, wherein a weight ratio of the pigment to binder is in the range of from 2:1 to 1:3.

2. The method according to claim 1, comprising the steps of:
    a) applying a curable compound to at least a portion of the substrate;
    b) contacting at least a portion of the curable compound with an optically variable image forming means;
    c) curing the curable compound; and
    d) depositing the metallic ink on at least a portion of the cured compound.

3. A security product obtained by the method as claimed in claim 1.

4. A method of producing a hot stamping foil comprising the steps of:
    (a) coating a carrier with a release coating,
    (b) applying a coating of a hard lacquer onto the release coating,
    (c) applying an ultraviolet primer coating onto the coating of the hard lacquer,
    (d) contacting at least a portion of the ultraviolet primer coating with an optically variable device forming means,
    (e) depositing a metallic ink to the UV primer holding the transferred optically variable device either as a whole or in partial areas, wherein the metallic ink comprises aluminum flakes having a thickness between 7 and 9 nm and a mean particle diameter D50 in the range of 9 to 10 μm and a binder,
    wherein a ratio of pigment to binder is sufficiently high to permit the alignment of the pigment particles to the contours of a diffraction grating, wherein a weight ratio of the pigment to binder is in the range of from 2:1 to 1:3,
    (f) optionally printing subsequently process colours, and
    (g) applying a heat activated adhesive onto the layer obtained in step e), or f).

5. A method of labeling an article of manufacture, the method comprising the steps of: contacting the heat activated adhesive layer of the hot stamping foil obtained according to claim 4 with said article; hot stamping said hot stamping foil to cause said heat activated adhesive layer to adhere to said article; and removing the carrier of said hot stamping foil from said hard lacquer layer.

* * * * *